3,572,306
COMPRESSED-AIR STARTER WITH WATER
DRAINAGE ARRANGEMENT
Paul Hurlimann, Zurich, Switzerland, assignor to Nova-Werke, Ferber & Wran, Zurich, Switzerland
Filed May 8, 1969, Ser. No. 823,014
Claims priority, application Switzerland, May 10, 1968, 6,989/68
Int. Cl. F01l 13/08; F02n 17/00
U.S. Cl. 123—179    2 Claims

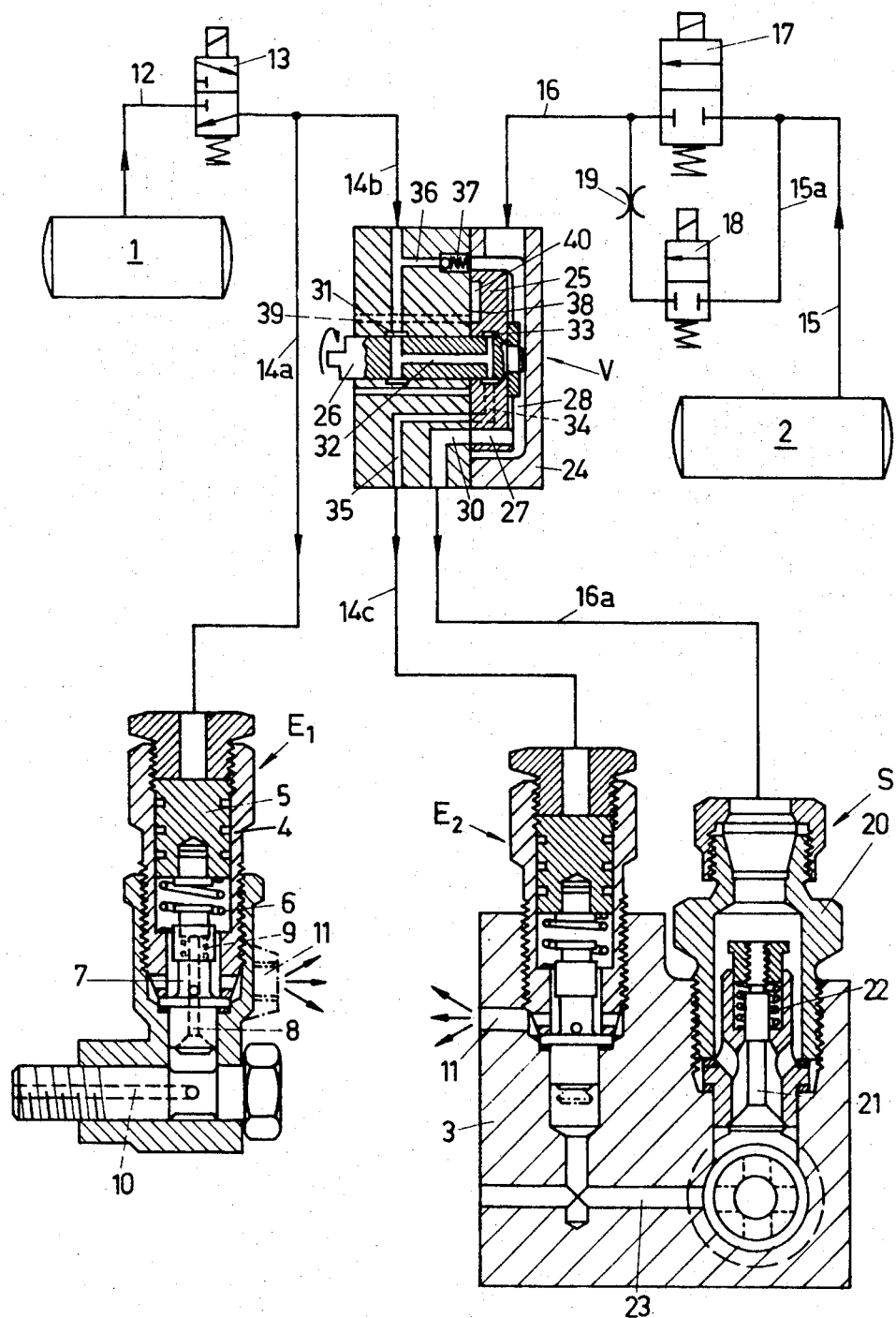

ABSTRACT OF THE DISCLOSURE

A source of air compressed at a relatively low pressure is connected to the pneumatically operated drain valves in the cylinder heads, by means of a series of special passageways in the distributor.

BACKGROUND OF THE INVENTION

In certain cases, such as marine installations, the cylinders of diesel engines must be emptied of their water before starting. Any water present must be expelled by the stroking of the piston. To this end, special drain valves are built into the cylinder heads. With diesel engines that are provided with mechanical starting motors, these drain valves, which may be pneumatically operated, are opened simultaneously. The crankshaft is then turned through several revolutions to expel any water in the cylinders, whereupon the drain valves are again closed, and the actual starting begun.

Up to the present time it has not been possible to start a diesel engine, which must first be drained of its water, by admitting compressed air into its cylinders, since the starting air admitted into the cylinders would escape through the open drain valves without having once moved the pistons. In order to crank the engine with compressed air and at the same time to expel the water, the drain valves of a four-stroke-cycle engine must be closed during the power stroke.

SUMMARY OF THE INVENTION

The chief object of the invention is to provide a compressed-air starter for diesel engines that fulfills this goal.

BRIEF DESCRIPTION OF THE DRAWING

The invention will be described, with reference to the figure of the accompanying drawing, wherein an embodiment of the invention is schematically represented partly in section.

DESCRIPTION OF THE PREFERRED EMBODIMENT

The single figure illustrates schematically one embodiment of the invention, and shows a compressed-air starter for a V-engine of which one bank of cylinders is provided only with drainage valves and the other bank with both drainage and starting valves. The figure does not show the engine itself but instead only one drainage valve of one bank and one pair of drainage and starting valves of the other bank.

The compressed-air starter comprises a compressed air tank 1 with a pressure of 6 to 10 atmospheres and a second compressed air tank 2 with a pressure of 15 to 40 atmospheres. The tank 1 is for the operation of the drainage valves $E_1$ and $E_2$, and the tank 2 supplies starting air and is connected through a single plate distributor V to the starting-air valves S. In the case of a V-12 engine, there would be six separate drainage valves $E_1$ and six pairs of the drainage valves $E_2$ and starting valves S, each pair being arranged in a common housing 3.

The drainage valves $E_1$ and $E_2$ are constructed similarly. A piston 5 is arranged in a housing 4 consisting of several parts screwed together, the piston being held in its upper end position, as illustrated, by a compression spring 6. The housing 4 further has a valve case 7 holding a valve 8, which is pressed into its closing position by a spring 9. The valve 8 closes the passage between the line 10, connected to the cylinder head, and the drainage opening 11.

The drain valves $E_1$ and $E_2$ are connected by means of a line 12, a valve 13, and lines 14a, 14b, and 14c to the source of compressed air 1, the line 14a being directly connected to the valve $E_1$, the line 14b to the distributor V, and the line 14c to the valve $E_2$. When the valve 13 is operated to open, compressed air flows against the upper end of the piston 5, forcing the latter down to open the valve 8.

A line 15 connects the source of compressed air 2 to a valve 17; and the line 16, the distributor V, and the lines 16a connect the source 2 to the starting valves S. A line 15a branching from the line 15 is connected through a valve 18 and a pressure-regulating valve 19 to the line 16.

The starting valve S has a housing 20 in which is arranged a valve 21 held in its closing position by a compression spring 22. When starting air enters the housing 20, the valve 21 is opened and starting air flows through the channel 23 in the cylinder head.

The distributor V has a housing 24 in which a distributor plate 25 is mounted on a shaft 26 so as to permit one to rotate relative to the other. This shaft is driven in a known manner at one-half the crankshaft speed, by, for example, a four-stroke-cycle engine off of the cam shaft. The distributor plate 25 embodies the usual control passage 27 that connects each starting valve S, during the power stroke of the piston of its cylinder, with the compressed-air source 2. The starting air flows from the line 16, through the chamber 28 and the passage 27, to the passages 30 and into the respective lines 16a.

The air line 14b for discharging the water is also connected to the distributor V. The air for discharging the water flows from the line 14b to an annular conduit 31, through a bore 32 in the shaft 26 to an annular conduit 33, through a control passage 34 into the conduits 35, and then to the respective lines 14c. The control passage 34 admits compressed air in turn to each drain valve $E_2$ while its piston is in its compression stroke. The valves $E_2$ are again closed by venting the pistons 5 through the distributor-plate connecting passage 40 and the conduit 39.

The compressed air starter works as follows. If the engine cylinders are to be discharged of their water before starting, the valve 13 is opened, permitting compressed air to flow from the tank 1 to all of the drain valves $E_1$ and to that drain valve $E_2$ of which the piston of the corresponding cylinder is executing a compression stroke. To discharge the water, the crankshaft is caused to turn slowly by opening the valve 18. The highly compressed air flows out of the tank 2 and through the pressure-regulating valve 19 and the lines 16 and 16a to the starting valves S. Since the valve 19 greatly reduces the air pressure, the engine turns over slowly, the pistons pushing out any water present through the drain valves $E_1$ and $E_2$. After a number of revolutions, the valves 18 and 13 are closed. Valve 13 is a three-way valve which now closes the line 12 and connects the lines 14a and 14b to the atmosphere, causing the valves $E_1$ and $E_2$ to close. The actual starting of the diesel engine can now begin in a known manner by opening the valve 17.

The valves 13 and 18, in accordance with the invention, can be combined.

The distributor housing 24 further incorporates a connecting passage 36 having a check valve 37 that connects the low-pressure conduits 31, 33, and 35, bore 32, and passage 34 to the high-pressure chamber 28. By operating the valve 13, air compressed at a relatively low pressure is admitted through the check valve 37 into the chamber 28, to equalize the air pressure on the two sides of the distributor plate 25 and so to prevent this plate from being lifted off of its supporting surface 38.

I claim:
1. A compressed-air starter for diesel engines, including a plurality of starting valves included in at least some of the cylinder heads, a first source of compressed air, and a rotatable single-disc distributor for delivering starting air from said first source to individual ones of said starting valves in the order of ignition, the improvement comprising a plurality of pneumatically operated drain valves respectively included in the cylinder heads, means for temporarily maintaining said drain valves in a closed position to prevent air supplied from said first source from escaping through said drain valves, a second source of air compressed at a pressure lower than that of the first source, and a plurality of passageways for conveying compressed air from said second source through said distributor and to said drain valves for operating the latter such that each drain valve opens in its respective cylinder during the compression stroke of the respective cylinder-piston.

2. The compressed-air starter as defined in claim 1, wherein said distributor includes a housing, a high-pressure chamber for the starting air in said distributor housing, a connecting passage for connecting said plurality of passageways to said high-pressure chamber, and a check valve in said connecting passage for admitting air from said second source to said high-pressure chamber when the latter is free of compressed air of higher pressure from said first source.

References Cited

UNITED STATES PATENTS

| | | | |
|---|---|---|---|
| 1,834,311 | 12/1931 | Heywood | 123—179 |
| 3,032,965 | 5/1962 | Wistner | 123—179 |
| 3,342,170 | 9/1967 | McCreary | 123—182 |

FOREIGN PATENTS

| | | | |
|---|---|---|---|
| 275,258 | 6/1930 | Italy | 123—182 |
| 241,601 | 12/1911 | Germany | 123—182 |
| 422,254 | 9/1924 | Germany | 123—182 |

MARK M. NEWMAN, Primary Examiner

R. B. COX, Assistant Examiner

U.S. Cl. X.R.

123—182